United States Patent
Maruyama et al.

(10) Patent No.: US 10,760,993 B2
(45) Date of Patent: Sep. 1, 2020

(54) MEASUREMENT METHOD, MEASUREMENT DEVICE, AND NON-TRANSITORY RECORDING MEDIUM

(71) Applicants: FUJIKURA LTD., Tokyo (JP); NATIONAL UNIVERSITY CORPORATION SHIMANE UNIVERSITY, Shimane (JP)

(72) Inventors: Ryo Maruyama, Chiba (JP); Nobuo Kuwaki, Tokyo (JP); Fumihiko Ito, Shimane (JP)

(73) Assignees: Fujikura Ltd., Tokyo (JP); NATIONAL UNIVERSITY CORPORATION SHIMANE UNIVERSITY, Shimane (JP)

( * ) Notice: Subject to any disclaimer, the term of this patent is extended or adjusted under 35 U.S.C. 154(b) by 44 days.

(21) Appl. No.: 16/329,130

(22) PCT Filed: May 1, 2017

(86) PCT No.: PCT/JP2017/017191
§ 371 (c)(1),
(2) Date: Feb. 27, 2019

(87) PCT Pub. No.: WO2018/042760
PCT Pub. Date: Mar. 8, 2018

(65) Prior Publication Data
US 2019/0226941 A1    Jul. 25, 2019

(30) Foreign Application Priority Data
Aug. 31, 2016    (JP) ................. 2016-170297

(51) Int. Cl.
*G01M 11/00*    (2006.01)
*G01D 5/353*    (2006.01)

(52) U.S. Cl.
CPC ..... *G01M 11/3109* (2013.01); *G01D 5/35358* (2013.01); *G01D 5/35364* (2013.01);
(Continued)

(58) Field of Classification Search
CPC .......... G01D 5/35358; G01D 5/35364; G01M 11/3109; G01M 11/3145; G01M 11/33; G01M 11/39; G02B 6/00
See application file for complete search history.

(56) References Cited

U.S. PATENT DOCUMENTS

2009/0231682 A1    9/2009  Kashyap et al.
2013/0216176 A1    8/2013  Li et al.
(Continued)

FOREIGN PATENT DOCUMENTS

JP    H03-217953 A    9/1991
JP    H09-068479 A    3/1997
(Continued)

OTHER PUBLICATIONS

Japanese Office Action in corresponding Application No. 2016-170297 dated Jul. 17, 2018 (2 pages).
(Continued)

*Primary Examiner* — Violeta A Prieto
(74) *Attorney, Agent, or Firm* — Osha Liang LLP

(57) ABSTRACT

A measurement method for measuring an effective refractive index difference between two propagation modes of a multimode fiber is provided. The method includes: measuring a first Brillouin frequency shift v1 by specifying a frequency having a lowest-frequency peak out of peaks in a first frequency spectrum of scattered light in a first propagation mode; measuring a second Brillouin frequency shift v2 by specifying a frequency having a lowest-frequency peak out of peaks in a second frequency spectrum of scattered light in a second propagation mode; and calculating an effective (Continued)

refractive index difference $\Delta n_{eff}$ in accordance with $\Delta n_{eff} = (v1-v2)/(2kV_L)$ with use of the first Brillouin frequency shift v1, the second Brillouin frequency shift v2, a predetermined wave number k of light in a vacuum, and a predetermined constant $V_L$.

7 Claims, 6 Drawing Sheets

(52) U.S. Cl.
CPC ........ G01M 11/3145 (2013.01); G01M 11/33 (2013.01); G01M 11/39 (2013.01)

(56) References Cited

U.S. PATENT DOCUMENTS

| 2014/0036258 | A1 | 2/2014 | Nakamura et al. |
| 2016/0109223 | A1* | 4/2016 | Wang .................. G01B 11/168 356/33 |
| 2018/0057396 | A1* | 3/2018 | Li ...................... C03B 37/01237 |

FOREIGN PATENT DOCUMENTS

| JP | 2003-322616 A | 11/2003 |
| JP | 2012-225984 A1 | 11/2012 |
| JP | 2016-080600 A1 | 5/2016 |
| WO | 2016/060746 A1 | 4/2016 |

OTHER PUBLICATIONS

Japanese Office Action in corresponding Application No. 2016-170297 dated Oct. 2, 2018 (2 pages).

Horiguchi, T. et al.; "BOTDA—Nondestructive Measurement of Single-Mode Optical Fiber Attenuation Characteristics Using Brillouin Interaction: Theory"; Journal of Lightwave Technology, vol. 7, No. 8, Aug. 1989, pp. 1170-1176, (7 pages).

Kurashima, T. et al.; "Brillouin Optical-Fiber Time Domain Reflectometry", IEICE Transaction on Comminications, vol. E76-B, No. 4, Apr. 1993, pp. 382-390 (9 pages).

Schulze, C. et al; "Measurement of effective refractive index differences in multimode optical fibers based on modal decomposition"; Optics Letters, vol. 39, No. 20, Oct. 15, 2014 (4 pages).

Yokota M , et al.; "Distributional measurement of effective refractive index differences of multimode fibers by Brillouin spectrum decomposition" Proc. of SPIE, Apr. 24, 2017, vol. 10323, pp. 1032382-1-1032382-4 (5 pages).

An Li et al., "Characterization of stimulated Brillouin scattering in a circular-core two-mode fiber using optical time-domain analysis"; Optics Express, vol. 21, No. 26; pp. 31894-31906; Published Dec. 16, 2013 (13 pages).

Extended European Search Report issued in corresponding European Patent Application No. 17845771.9 dated Jul. 11, 2019 (11 pages).

* cited by examiner

MEASUREMENT METHOD, MEASUREMENT DEVICE, AND NON-TRANSITORY RECORDING MEDIUM

BACKGROUND

Technical Field

The present invention relates to a measurement method, a measurement device, and a non-transitory recording medium, each of which is for measuring an effective refractive index difference between propagation modes which a multimode fiber has.

Background Art

In recent years, multimode fibers having a plurality of propagation modes have been actively developed. According to a transmission system employing a multimode fiber as a transmission medium, an effective refractive index difference between propagation modes which the multimode fiber has is an important design parameter. Therefore, a measurement method for measuring an effective refractive index difference between propagation modes in a multimode fiber has been demanded.

Non-Patent Literature 1 discloses that an effective refractive index difference between propagation modes in a multimode fiber can be measured by the following method. That is, by applying periodic external force to the multimode fiber, a refractive index grating is formed in which a refractive index varies in a light propagation direction. Then, while a grating period of the refractive index grating is varied, strength of coupling between respective powers of the propagation modes is measured. It is known that, in so doing, a reciprocal of the grating period which causes the strength of the coupling between the respective powers of the propagation modes to be maximized matches a propagation constant difference between the propagation modes. Therefore, by measuring the grating period which causes the strength of the coupling between the respective powers of the propagation modes to be maximized, it is possible to calculate the effective refractive index difference between the propagation modes from the grating period thus measured.

CITATION LIST

Non-Patent Literature

[Non-Patent Literature 1] Christian Schulze, Johannes Wilde, Robert Bruning, Siegmund Schroter, and Michael Duparre, Measurement of effective refractive index differences in multimode optical fibers based on modal decomposition, OPTICS LETTERS, Vol. 39, No. 20, Oct. 15, 2014

[Non-Patent Literature 2] Toshio Kurashima et al., Brillouin Optical-Fiber Time Domain Reflectometry, IEICE Transaction on Comminications, Vol. E76, No. 4, pp. 382-390, 1993

[Non-Patent Literature 3] T. Horiguchi and M. Tateda, BOTDA-Nondestructive Measurement of Single-Mode Optical Fiber Attenuation Characteristics Using Brillouin Interaction: Theory, J. Lightwave technol., Vol. 7, No. 8, pp. 1170-1176, 1989

However, according to a measurement method disclosed in Non-Patent Literature 1, it is not possible to measure an effective refractive index difference between propagation modes at a specific point in a multimode fiber. Namely, according to the measurement method disclosed in Non-Patent Literature 1, it is not possible to measure the effective refractive index difference between the propagation modes at each point in the multimode fiber, that is, it is not possible to measure spatial distribution, in a longitudinal direction, of the effective refractive index difference between the propagation modes in the multimode fiber (hereinafter, referred to as "longitudinal distribution").

SUMMARY

One or more embodiments of the present invention realize a measurement method, a measurement device, and a measurement program, each of which allows measurement of an effective refractive index difference between propagation modes at a specific point in a multimode fiber.

One or more embodiments of a measurement method of the present invention provide a measurement method for measuring an effective refractive index difference between two propagation modes which a multimode fiber has, the method including the steps of: (a) measuring a first Brillouin frequency shift ν1 by specifying a frequency which gives the lowest-frequency peak out of peaks included in a frequency spectrum of scattered light in a first propagation mode which scattered light occurs in a case where light in the first propagation mode is inputted into the multimode fiber; (b) measuring a second Brillouin frequency shift ν2 by specifying a frequency which gives the lowest-frequency peak out of peaks included in a frequency spectrum of scattered light in a second propagation mode which scattered light occurs in a case where light in the second propagation mode is inputted into the multimode fiber; and (c) calculating an effective refractive index difference $\Delta n_{eff}$ in accordance with $\Delta n_{eff} = (\nu 1 - \nu 2)/(2kV_L)$ with use of (i) the first Brillouin frequency shift ν1 measured in the step (a), (ii) the second Brillouin frequency shift ν2 measured in the step (b), (iii) a predetermined wave number k of light in a vacuum, and (iv) a predetermined constant $V_L$.

One or more embodiments of a measurement device of the present invention provide a measurement device for measuring an effective refractive index difference between two propagation modes which a multimode fiber has, the device including: a BOTDR having an output port and an input port; a circulator having a first port, a second port, and a third port, the first port of the circulator being connected to the output port of the BOTDR, the third port of the circulator being connected to the input port of the BOTDR; first and second single-mode fibers each having an input end and an output end, any one of the input end of the first single-mode fiber and the input end of the second single-mode fiber being switchably connected to the second port of the circulator; and a mode coupler having a first input port, a second input port, and an output port, the first input port of the mode coupler being connected to the output end of the first single-mode fiber, the second input port of the mode coupler being connected to the output end of the second single-mode fiber, the output port of the mode coupler being connected to an input end of the multimode fiber, the mode coupler being configured to couple a propagation mode in the first single-mode fiber with a first propagation mode in the multimode fiber and couple a propagation mode in the second single-mode fiber with a second propagation mode in the multimode fiber.

One or more embodiments of a measurement device of the present invention provide a measurement device for measuring an effective refractive index difference between two propagation modes which a multimode fiber has, the device including: a BOTDA having a pump light output port and a probe light input port; a circulator having a first port, a second port, and a third port, the first port of the circulator being connected to the pump light output port of the BOTDA, the third port of the circulator being connected to the probe light input port of the BOTDA; first and second single-mode fibers each having an input end and an output end, any one of the input end of the first single-mode fiber and the input end of the second single-mode fiber being switchably connected to the second port of the circulator; a first mode coupler having a first input port, a second input port, and an output port, the first input port of the first mode coupler being connected to the output end of the first single-mode fiber, the second input port of the first mode coupler being connected to the output end of the second single-mode fiber, the output port of the first mode coupler being connected to an input end of the multimode fiber, the first mode coupler being configured to couple a propagation mode in the first single-mode fiber with a first propagation mode in the multimode fiber and couple a propagation mode in the second single-mode fiber with a second propagation mode in the multimode fiber; third and fourth single-mode fibers each having an input end and an output end, any one of the output end of the third single-mode fiber and the output end of the fourth single-mode fiber being switchably connected to the probe light input port of the BOTDA; and a second mode coupler having an input port, a first output port, and a second output port, the input port of the second mode coupler being connected to an output end of the multimode fiber, the first output port of the second mode coupler being connected to the input end of the third single-mode fiber, the second output port of the second mode coupler being connected to the input end of the fourth single-mode fiber, the second mode coupler being configured to couple the first propagation mode in the multimode fiber with a propagation mode in the third single-mode fiber and couple the second propagation mode in the multimode fiber with a propagation mode in the second single-mode fiber.

One or more embodiments of a measurement program of the present invention provide a measurement program for measuring an effective refractive index difference between two propagation modes which a multimode fiber has, the program causing a computer to carry out procedures for: (a) measuring a first Brillouin frequency shift v1 by specifying a frequency which gives the lowest-frequency peak out of peaks included in a frequency spectrum of scattered light in a first propagation mode which scattered light occurs in a case where light in the first propagation mode is inputted into the multimode fiber; (b) measuring a second Brillouin frequency shift v2 by specifying a frequency which gives the lowest-frequency peak out of peaks included in a frequency spectrum of scattered light in a second propagation mode which scattered light occurs in a case where light in the second propagation mode is inputted into the multimode fiber; and (c) calculating an effective refractive index difference $\Delta n_{eff}$ in accordance with $\Delta n_{eff}=(v1-v2)/(2kV_L)$ with use of (i) the first Brillouin frequency shift v1 measured in the step (a), (ii) the second Brillouin frequency shift v2 measured in the step (b), (iii) a predetermined wave number k of light in a vacuum, and (iv) a predetermined constant $V_L$.

According to one or more embodiments of the present invention, it is possible to measure an effective refractive index difference between propagation modes at a specific point in a multimode fiber. Furthermore, according to one or more embodiments of the present invention, it is possible to measure distribution of the effective refractive index difference between the propagation modes in the multimode fiber.

BRIEF DESCRIPTION OF THE DRAWINGS

FIG. 3A illustrates a state where a first single-mode fiber for measurement of an LP01 mode is connected to a BOTDR via a circulator. FIG. 3B illustrates a state where a second single-mode fiber for measurement of an LP11 mode is connected to the BOTDR via the circulator.

FIG. 4A illustrates a state where a first single-mode fiber for measurement of an LP01 mode is connected to a BOTDA via a circulator. FIG. 4B illustrates a state where a second single-mode fiber for measurement of an LP11 mode is connected to the BOTDA via the circulator.

DETAILED DESCRIPTION

[Measurement Principle]

Figure 1A:
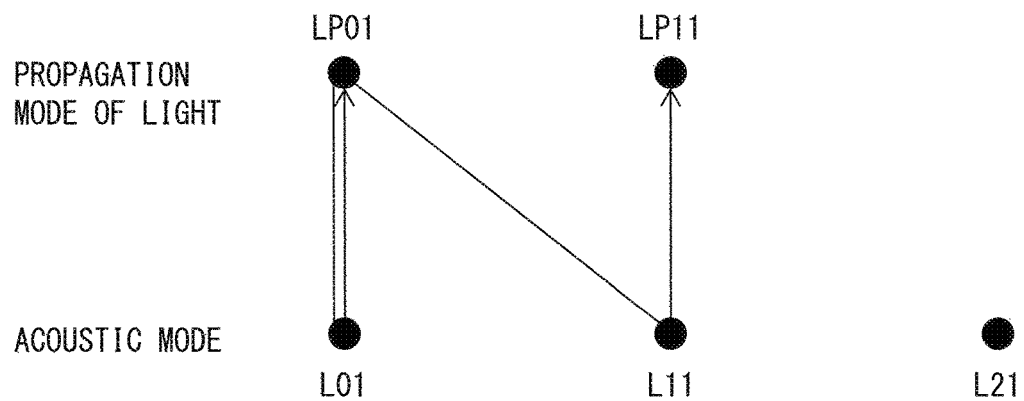
FIG. 1A is a diagram illustrating a scattering process of Brillouin scattering which can occur in a multimode fiber in a case where light in an LP01 mode is inputted.

One or more embodiments of the present invention relates to a measurement method for measuring an effective refractive index difference of a multimode fiber on the basis of scattered light which occurs due to Brillouin scattering. Here, before embodiments of the present invention are described, a measurement principle will be described below on which one or more embodiments of the present invention are based. Note that the measurement principle described below is a novel measurement principle which the inventors of the present application have devised by themselves and which is disclosed for the first time in this specification.

(Brillouin Scattering)

Brillouin scattering is a phenomenon in which inputted light is scattered backward due to an acoustic mode which thermally occurs. A frequency of light which occurs due to the Brillouin scattering (hereinafter, referred to as "scattered light") in an optical fiber is lower, by approximately 11 GHz, than that of inputted light. A difference between the frequency of the inputted light and the frequency of the scattered light is referred to as a Brillouin frequency shift.

As well known, the following two conditions need to be satisfied so that Brillouin scattering occurs in an optical fiber.

A first condition is a Bragg condition. That is, Expression (1) is established between an effective refractive index $n_i$ for inputted light and an effective refractive index $n_j$ for scattered light. In Expression (1), $K_l$ represents a propagation constant, in a propagation axis direction, of an acoustic mode which is involved in the Brillouin scattering (l represents a mode number of the acoustic mode), and k represents a wave number of light in a vacuum.

[Math. 1]

$$kn_i + kn_j = K_l \quad (1)$$

A second condition is that an overlap integral $\gamma_{ij1}$ defined by Expression (2) is not zero. In Expression (2), x and y each represents a coordinate in a cross-sectional direction of the optical fiber, $\varphi_i(x, y)$ represents a field profile of the inputted light, and $\varphi_j(x, y)$ represents a field profile of the scattered light. $\Psi_l$ represents a profile of a change in refractive index which change is caused due to the acoustic mode which is involved in the Brillouin scattering, and * represents phase conjugation.

[Math. 2]

$$\gamma_{ij1} = \iint \varphi^*_j(x,y) \Psi^*_l(x,y) \varphi_i(x,y) dx dy \quad (2)$$

Note that an acoustic mode which is involved in Brillouin scattering in an optical fiber is a longitudinal vibration mode which has displacement in a propagation axis direction of the optical fiber. A profile of a change in refractive index which change is caused due to each acoustic mode is similar to a field profile of any propagation mode in the optical fiber. In the description below, an acoustic mode which causes a profile of a change in refractive index to be similar to a field profile of an LPmn mode will be represented by Lmn.

(Modes of Scattered Light which can Occur)

A multimode fiber (two-mode fiber) having merely an LP01 mode and an LP11 mode as propagation modes will be taken as an example, and modes of scattered light which can occur will be studied for each of modes of inputted light.

In the description below, a scattering process in which scattered light in an LPj1 mode occurs from inputted light in an LPi1 mode via an acoustic mode Lmn will be represented by <LPi1→Lmn→LPj1> (i, j=0 or 1). For example, <LP01→L01→LP01> represents a process in which scattered light in the LP01 mode occurs from inputted light in the LP01 mode via an acoustic mode L01, and <LP11→L01→LP11> represents a process in which scattered light in the LP11 mode occurs from inputted light in the LP11 mode via the acoustic mode L01.

In a case where a mode of inputted light is the LP01 mode, there can be a scattering process <LP01→Lmn→LP01>, in which a mode of scattered light is the LP01 mode, and a scattering process <LP01→Lmn→LP11>, in which a mode of scattered light is the LP11 mode. Out of such scattering processes, the following two scattering processes each result in that an overlap integral defined by Expression (2) is not zero. The other scattering processes each result in that an overlap integral defined by Expression (2) is zero due to symmetry of modes.

<LP01→L01→LP01>

<LP01→L11→LP11>

That is, in a case where a mode of inputted light is the LP01 mode, the following scattered light occurs as illustrated in FIG. 1A: (1) scattered light in the LP01 mode, which scattered light has been scattered via the acoustic mode L01; and (2) scattered light in the LP11 mode, which scattered light has been scattered via an acoustic mode L11.

In a case where a mode of inputted light is the LP mode, the following three scattering processes each result in that an overlap integral defined by Expression (2) is not zero, out of possible scattering processes <LP11→Lmn→LP01> and <LP11→Lmn→LP11>. The other scattering processes each result in that an overlap integral defined by Expression (2) is zero due to symmetry of modes.

<LP11→L01→LP11>

<LP11→L21→LP11>

<LP11→L11→LP01>

Figure 1B:
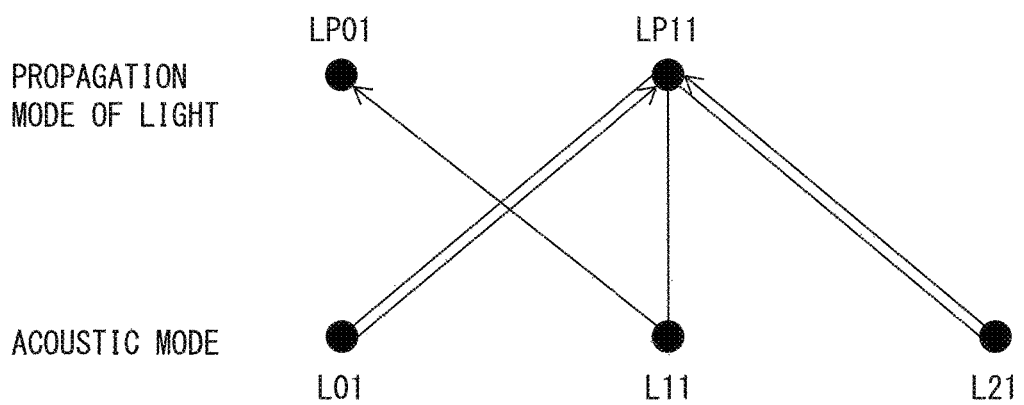
FIG. 1B is a diagram illustrating a scattering process of Brillouin scattering which can occur in a multimode fiber in a case where light in an LP mode is inputted.

Therefore, in a case where a mode of inputted light is the LP11 mode, the following scattered light occurs as illustrated in FIG. 1B: (1) scattered light in the LP11 mode, which scattered light has been scattered via the acoustic mode L01; (2) scattered light in the LP11 mode, which scattered light has been scattered via an acoustic mode L21; and (3) scattered light in the LP01 mode, which scattered light has been scattered via the acoustic mode L11.

(Measurement of Brillouin Frequency Shift $\nu_{LP01 \to LP01 \to LP01}$ with Use of LP01 Mode)

As has been described, in a case where a mode of inputted light is the LP01 mode, the following scattered light occurs: (1) scattered light in the LP01 mode, which scattered light has been scattered via the acoustic mode L01; and (2) scattered light in the LP11 mode, which scattered light has been scattered via the acoustic mode L11. Therefore, by selecting the LP01 mode as an observation target, it is possible to selectively observe scattered light which has been scattered via the acoustic mode L01.

Studied below will be a scattering process <LP01→L01→LP01> of Brillouin scattering which occurs via the acoustic mode L01, in a case where a mode of inputted light and a mode of scattered light, which is an observation target, are each the LP01 mode.

As a Bragg condition for the scattering process <LP01→L01→LP01>, an effective refractive index $n_{LP01}$ for the LP01 mode and a propagation constant $K_{L01}$ of the acoustic mode L01 have a relationship therebetween defined by Expression (3).

[Math. 3]

$$2kn_{LP01} = K_{L01} \quad (3)$$

A Brillouin frequency shift $\nu_{LP01 \to L01 \to LP01}$ in the scattering process <LP01→L01→LP01> is given by Expression (4). Note that, in Expression (4), $V_{L01}$ represents a longitudinal phase velocity of the acoustic mode L01 (also referred to as a "lengthwise phase velocity" or an "axial phase velocity").

[Math. 4]

$$\nu_{LP01 \to L01 \to LP01} = K_{L01} V_{L01} = 2kn_{LP01} V_{L01} \quad (4)$$

Figure 2A:
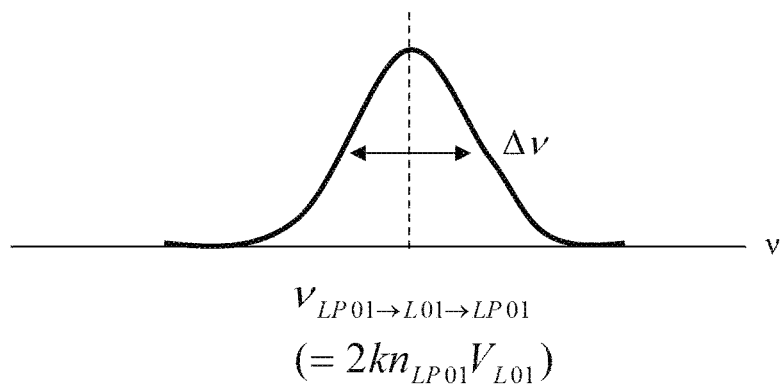
FIG. 2A is a graph illustrating a frequency spectrum of scattered light in an LP01 mode which scattered light occurs in a multimode fiber in a case where light in an LP01 mode is inputted.

An observed frequency spectrum f(ν) of the scattered light is a Lorentzian function having a peak at $\nu = \nu_{LP01 \to L01 \to LP01}$ as shown by Expression (5). FIG. 2A shows a graph of this frequency spectrum f(ν). Note that, in Expression (5), Δν represents a constant ($\Delta\nu = 1/(\pi \tau_c)$) determined depending on a lifetime $\tau_c$ of an acoustic mode (which lifetime $\tau_c$ is constant regardless of the mode), and represents a width (full width at half maximum) of a peak in a frequency spectrum f(ν).

[Math. 5]

$$f(\nu) = \frac{\gamma_{LP01 \to L01 \to LP01} \Delta \nu}{(\nu - \nu_{LP01 \to L01 \to LP01})^2 + (\Delta \nu / 2)^2} \quad (5)$$

Therefore, in a case where a mode of inputted light and a mode of scattered light, which is an observation target, are each the LP01 mode, it is possible to specify a Brillouin frequency shift $\nu_{LP01 \to L01 \to LP01}$ by specifying a frequency which gives a peak in an observed frequency spectrum f(ν) of the scattered light.

Note that, in a case where acoustic modes which are higher than an L21 mode are involved in Brillouin scattering, an observed frequency spectrum f(ν) of scattered light can include further peaks. Note, however, that such peaks are formed at respective frequencies which are higher than a Brillouin frequency shift $\nu_{LP01 \to L01 \to LP01}$ to be specified. Therefore, even in this case, it is possible to absolutely specify the Brillouin frequency shift $\nu_{LP01 \to L01 \to LP01}$ by specifying a frequency which gives the lowest-frequency peak, out of peaks in the observed frequency spectrum f(ν) of the scattered light.

(Measurement of Brillouin Frequency Shift $\nu_{LP11 \to L01 \to LP11}$ with Use of LP11 Mode)

As has been described, in a case where a mode of inputted light is the LP11 mode, the following scattered light occurs: (1) scattered light in the LP mode, which scattered light has been scattered via the acoustic mode L01; (2) scattered light in the LP mode, which scattered light has been scattered via the acoustic mode L21; and (3) scattered light in the LP01 mode, which scattered light has been scattered via the acoustic mode L11. Therefore, by selecting the LP mode as an observation target, it is possible to selectively observe (i) scattered light which has been scattered via the acoustic mode L01 and (ii) scattered light which has been scattered via the acoustic mode L21.

Studied below will be (i) a scattering process <LP11→L01→LP11> of Brillouin scattering which occurs via the acoustic mode L01 and (ii) a scattering process <LP11→L21→LP11> of Brillouin scattering which occurs via the acoustic mode L21, in a case where a mode of inputted light and a mode of scattered light, which is an observation target, are each the LP11 mode.

As a Bragg condition for the scattering process <LP11→L01→LP11>, an effective refractive index $n_{LP11}$ for the LP mode and a propagation constant $K_{L01}$ of the acoustic mode L01 have a relationship therebetween defined by Expression (6). As a Bragg condition for the scattering process <LP11→L21→LP11>, the effective refractive index $n_{LP11}$ for the LP mode and a propagation constant $K_{L21}$ of the acoustic mode L21 have a relationship therebetween defined by Expression (7).

[Math. 6]

$$2kn_{LP11} = K_{L01} \quad (6)$$

[Math. 7]

$$2kn_{LP11} = K_{L21} \quad (7)$$

A Brillouin frequency shift $\nu_{LP11 \to L01 \to LP11}$ in the scattering process <LP11→L01→LP11> is given by Expression (8). A Brillouin frequency shift $\nu_{LP11 \to L01 \to LP11}$ in the scattering process <LP11→L21→LP11> is given by Expression (9). Note that, in Expression (8), $V_{L01}$ represents a longitudinal phase velocity of the acoustic mode L01, as has been described, and, in Expression (9), $V_{L21}$ represents a longitudinal phase velocity of the acoustic mode L21.

[Math. 8]

$$\nu_{LP11 \to L01 \to LP11} = K_{L01} V_{L01} = 2kn_{LP11} V_{L01} \quad (8)$$

[Math. 9]

$$\nu_{LP11 \to L21 \to LP11} = K_{L21} V_{L21} = 2kn_{LP11} V_{L21} \quad (9)$$

Figure 2B:
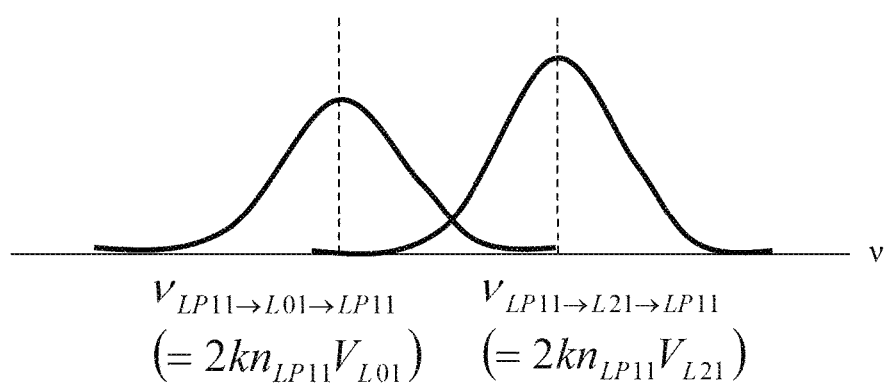
FIG. 2B is a graph illustrating a frequency spectrum of scattered light in an LP11 mode which scattered light occurs in a multimode fiber in a case where light in an LP11 mode is inputted.

An observed frequency spectrum f(ν) of the scattered light is superposition of (i) a Lorentzian function having a peak at $\nu = \nu_{LP11 \to L01 \to LP11}$ and (ii) a Lorentzian function having a peak at $\nu = \nu_{LP11 \to L21 \to LP11}$, as shown by Expression (10). FIG. 2B shows a graph of this frequency spectrum f(ν). Note that, in Expression (10), as has been described, Δν represents a constant determined depending on a lifetime of each acoustic mode, and represents a width of each peak in a frequency spectrum f(ν).

[Math. 10]

$$f(\nu) = \frac{\gamma_{LP11 \to L01 \to LP11} \Delta \nu}{(\nu - \nu_{LP11 \to L01 \to LP11})^2 + (\Delta \nu / 2)^2} + \frac{\gamma_{LP11 \to L21 \to LP11} \Delta \nu}{(\nu - \nu_{LP11 \to L21 \to LP11})^2 + (\Delta \nu / 2)^2} \quad (10)$$

Therefore, in a case where a mode of inputted light and a mode of scattered light, which is an observation target, are each the LP mode, it is possible to specify a Brillouin frequency shift $\nu_{LP11 \to L01 \to LP11}$ and a Brillouin frequency shift $\nu_{LP11 \to L01 \to LP11}$ by specifying frequencies which give respective two peaks in an observed frequency spectrum f(ν) of the scattered light.

Note that a frequency which gives a lower-frequency peak, out of the two peaks in the frequency spectrum f(ν) of the scattered light, is $\nu_{LP11 \to L01 \to LP11}$, and a frequency which gives a higher-frequency peak, out of the two peaks in the frequency spectrum f(ν) of the scattered light, is $\nu_{LP11 \to L01 \to LP11}$. This is because, as a mode becomes higher, an effective refractive index becomes lower, that is, $V_{L01} < V_{L02}$ is established. Therefore, it is possible to specify the Brillouin frequency shift $\nu_{LP11 \to L01 \to LP11}$ by specifying the frequency which gives the lower-frequency peak, out of the two peaks in the observed frequency spectrum f(ν) of the scattered light.

In a case where acoustic modes which are higher than the L21 mode are involved in Brillouin scattering, an observed frequency spectrum f(ν) of scattered light can include further peaks. Note, however, that such peaks are formed at respective frequencies which are higher than a Brillouin frequency shift $\nu_{LP11 \to L01 \to LP11}$ to be specified. Therefore, even in this case, it is possible to absolutely specify the Brillouin frequency shift $\nu_{LP11 \to L01 \to LP11}$ by specifying a frequency which gives the lowest-frequency peak, out of peaks in the observed frequency spectrum f(ν) of the scattered light.

(Brillouin Frequency Shift and Effective Refractive Index Difference)

An effective refractive index difference $\Delta n_{eff} = n_{LP01} - n_{LP11}$ between the LP01 mode and the LP mode is given by Expression (11) based on Expressions (4) and (8).

[Math. 11]

$$\Delta n_{eff} = n_{LP01} - n_{LP11} = \frac{v_{LP01 \to L01 \to LP01} - v_{LP11 \to L01 \to LP11}}{2kV_{L01}} \quad (11)$$

Therefore, by measuring a Brillouin frequency shift $v_{LP01 \to L01 \to LP01}$ and a Brillouin frequency shift $v_{LP11 \to L01 \to LP11}$, it is possible to calculate the effective refractive index difference $\Delta n_{eff}$ between the LP01 mode and the LP mode in accordance with Expression (11) with use of the Brillouin frequency shift $v_{LP01 \to L01 \to LP01}$ and the Brillouin frequency shift $v_{LP11 \to L01 \to LP11}$.

Note that a longitudinal phase velocity $V_{L01}$ of the LP01 mode shown in Expression (11) can be approximated by a longitudinal phase velocity of fused quartz, that is, 5977 m/s. Therefore, by setting $V_{L01}$ to 5977 m/s, an accurate effective refractive index difference $\Delta n_{eff}$ is obtained by Expression (11). In a case where concentrations of various impurities contained in a multimode fiber are known, a more accurate effective refractive index difference $\Delta n_{eff}$ is obtained by correcting a value of $V_{L01}$ depending on the concentrations of the various impurities.

[Measurement Device]

Figure 3A:
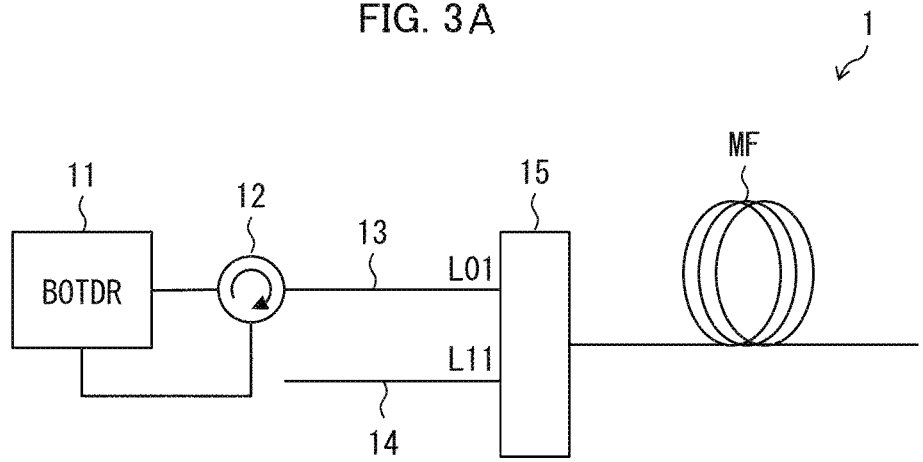
FIGS. 3A and 3B are block diagrams illustrating a measurement device in accordance with one or more embodiments of the present invention.
Figure 3B:
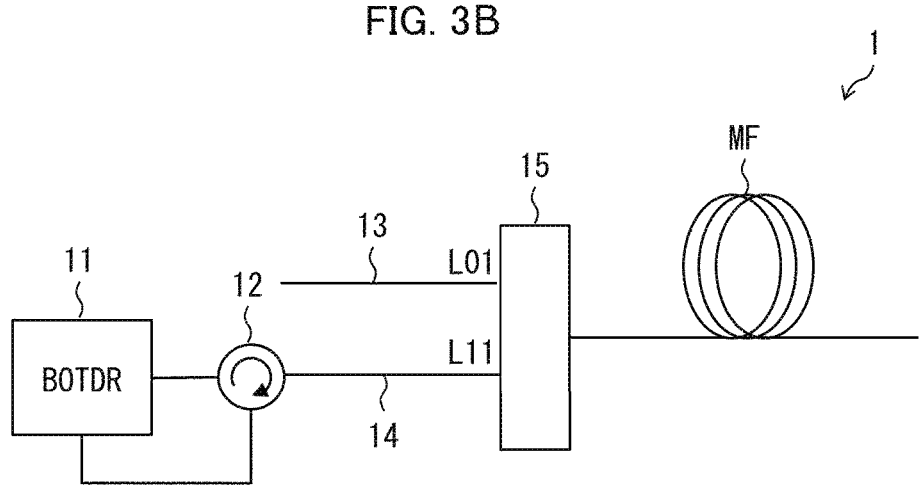

One or more embodiments of a measurement device of the present invention will be described below with reference to FIGS. 3A and 3B. FIGS. 3A and 3B are block diagrams of a measurement device 1 in accordance with one or more embodiments.

The measurement device 1 is a device for measuring an effective refractive index difference $\Delta n_{eff}$ of a multimode fiber MF, and includes a BOTDR (Brillouin Optical-Fiber Time Domain Reflectometry) 11, a circulator 12, single-mode fibers 13 and 14, and a mode coupler 15.

The BOTDR 11 includes an output port and an input port. The output port of the BOTDR 11 is connected to a first port of the circulator 12, and the input port of the BOTDR 11 is connected to a third port of the circulator 12. The BOTDR 11 has (i) a function of outputting pulsed light through the output port and (ii) a function of measuring a Brillouin frequency shift at each point in the multimode fiber MF from a frequency spectrum of scattered light inputted through the input port, that is, a function of measuring distribution of the Brillouin frequency shift in the multimode fiber MF. Note that, for details of the BOTDR 11, Non-Patent Literature 2 should be referred to.

The circulator 12 includes three ports (that is, the first port, a second port, and the third port). In the circulator 12, light inputted through the first port is outputted through the second port, light inputted through the second port is outputted through the third port, and light inputted through the third port is outputted through the first port. As has been described, the first port of the circulator 12 is connected to the output port of the BOTDR 11, and the third port of the circulator 12 is connected to the input port of the BOTDR. The second port of the circulator 12 is connected to any one of respective entrance ends of the single-mode fibers 13 and 14. It is possible for an operator to freely switch between a connection pattern illustrated in FIG. 3A and a connection pattern illustrated in FIG. 3B. According to the connection pattern illustrated in FIG. 3A, the single-mode fiber 13 (first single-mode fiber) is connected to the second port of the circulator 12. According to the connection pattern illustrated in FIG. 3B, the single-mode fiber 14 (second single-mode fiber) is connected to the second port of the circulator 12.

The entrance end of the single-mode fiber 13 is connectable to the second port of the circulator 12, and an exit end of the single-mode fiber 13 is connected to a first input port of the mode coupler 15. The entrance end of the single-mode fiber 14 is connectable to the second port of the circulator 12, and an exit end of the single-mode fiber 14 is connected to a second input port of the mode coupler 15.

The mode coupler 15 includes two input ports (that is, the first input port and the second input port) and one output port. As has been described, the first input port of the mode coupler 15 is connected to the exit end of the single-mode fiber 13, and the second input port of the mode coupler 15 is connected to the exit end of the single-mode fiber 14. The output port of the mode coupler 15 is connected to an entrance end of the multimode fiber MF. The mode coupler 15 couples a propagation mode in the single-mode fiber 13 with an LP01 mode in the multimode fiber MF, and couples a propagation mode in the single-mode fiber 14 with an LP11 mode in the multimode fiber MF.

By connecting the single-mode fiber 13 to the second port of the circulator 12 as illustrated in FIG. 3A, it is possible to input, into the multimode fiber MF, pulsed light generated in the BOTDR 11, and possible to input, into the BOTDR 11, merely scattered light in the LP01 mode, out of scattered light having occurred in the multimode fiber MF. The BOTDR 11 specifies a Brillouin frequency shift $v_{LP01 \to L01 \to LP01}$ from a frequency spectrum of the scattered light in the LP01 mode.

Meanwhile, by connecting the single-mode fiber 14 to the second port of the circulator 12 as illustrated in FIG. 3B, it is possible to input, into the multimode fiber MF, pulsed light generated in the BOTDR 11, and possible to input, into the BOTDR 11, merely scattered light in the LP11 mode, out of scattered light having occurred in the multimode fiber MF. The BOTDR 11 specifies a Brillouin frequency shift $v_{LP11 \to L01 \to LP11}$ from a frequency spectrum of the scattered light in the LP11 mode.

An effective refractive index difference $\Delta n_{eff}$ between the LP01 mode and the LP11 mode is obtained by calculating $1/(2kV_{L01})$ of a difference between the Brillouin frequency shift $v_{LP01 \to L01 \to LP01}$ and the Brillouin frequency shift $v_{LP11 \to L01 \to LP11}$ with use of a computer embedded in or connected to the BOTDR 11.

Note that the BOTDR 11 is capable of obtaining a time series of Brillouin frequency shifts from frequency spectra of scattered light inputted at respective time points. The scattered light inputted into the BOTDR 11 at the respective time points correspond to scattered light having occurred at respective points in the multimode fiber MF. Therefore, it is possible to consider the time series of the Brillouin frequency shifts, which is obtained by the BOTDR 11, as longitudinal distribution (spatial distribution along a longitudinal axis) of a Brillouin frequency shift in the multimode fiber MF. Furthermore, it is possible to consider a time series of effective refractive index differences $\Delta n_{eff}$, which is obtained from the time series of the Brillouin frequency shifts, as longitudinal distribution of an effective refractive index difference $\Delta n_{eff}$ in the multimode fiber MF.

Figure 4A:
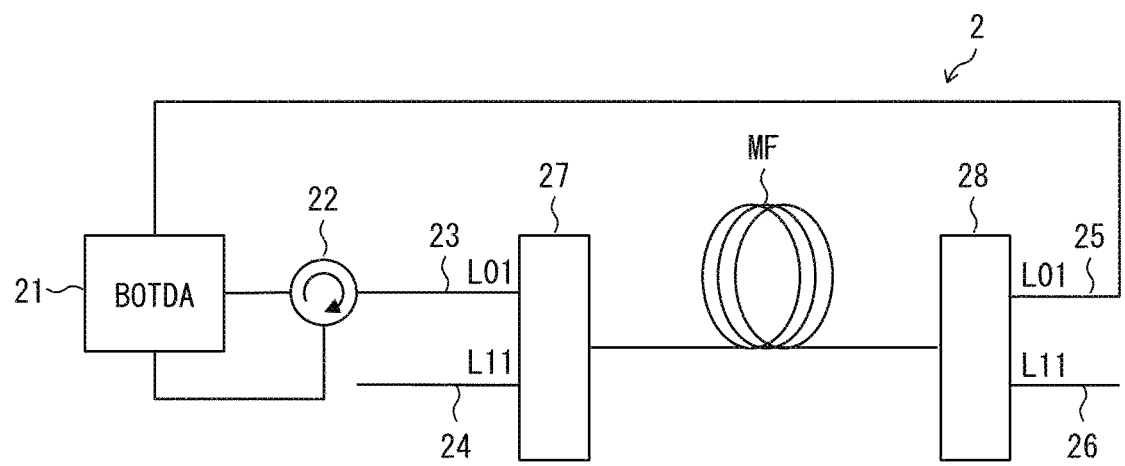
FIGS. 4A and 4B are block diagrams illustrating a measurement device in accordance with one or more embodiments of the present invention.
Figure 4B:
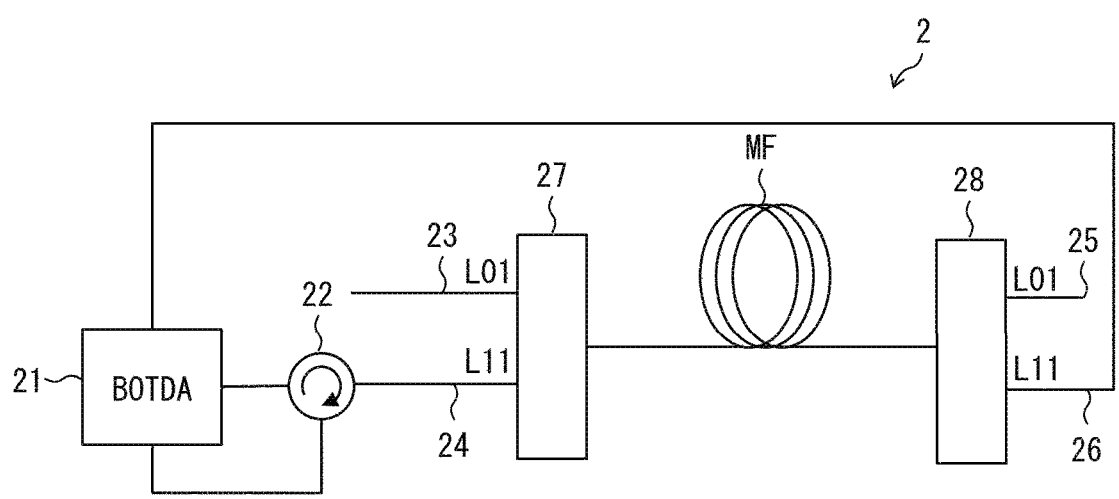

One or more embodiments of the measurement device of the present invention will be described below with reference to FIGS. 4A and 4B. FIGS. 4A and 4B are block diagrams of a measurement device 2 in accordance with one or more embodiments.

The measurement device 2 is a device for measuring an effective refractive index difference $\Delta n_{eff}$ of a multimode fiber MF, and includes a BOTDA (Brillouin Optical-Fiber Time Domain Analysis) 21, a circulator 22, single-mode fibers 23 through 26, and mode couplers 27 and 28.

The BOTDA 21 includes a pump light output port, a probe light output port, and a probe light input port. The pump light output port of the BOTDA 21 is connected to a first port of the circulator 22, and the probe light input port of the BOTDA 21 is connected to a third port of the circulator 22. The probe light output port of the BOTDA 21 is connected to the mode coupler 28 via any one of the single-mode fibers 25 and 26. The BOTDA 21 has (i) a function of outputting pulsed light through the pump light output port, (ii) a function of outputting continuous light through the probe light output port, and (iii) a function of measuring a Brillouin frequency shift at each point in the multimode fiber MF from a frequency spectrum of an amplification degree of probe light inputted through the probe light input port, that is, a function of measuring distribution of the Brillouin frequency shift in the multimode fiber MF. Note that, for details of the BOTDA 21, Non-Patent Literature 3 should be referred to.

The circulator 22 includes three ports (that is, the first port, a second port, and the third port). In the circulator 22, light inputted through the first port is outputted through the second port, light inputted through the second port is outputted through the third port, and light inputted through the third port is outputted through the first port. As has been described, the first port of the circulator 22 is connected to the pump light output port of the BOTDA 21, and the third port of the circulator 22 is connected to the probe light input port of the BOTDA. The second port of the circulator 22 is connected to any one of respective entrance ends of the single-mode fibers 23 and 24. It is possible for an operator to freely switch between a connection pattern illustrated in FIG. 4A and a connection pattern illustrated in FIG. 4B. According to the connection pattern illustrated in FIG. 4A, the single-mode fiber 23 is connected to the second port of the circulator 22, and the single-mode fiber 25 (third single-mode fiber) is connected to the probe light output port of the BOTDA. According to the connection pattern illustrated in FIG. 4B, the single-mode fiber 24 is connected to the second port of the circulator 22, and the single-mode fiber 26 (fourth single-mode fiber) is connected to the probe light output port of the BOTDA.

The entrance end of the single-mode fiber 23 is connectable to the second port of the circulator 22, and an exit end of the single-mode fiber 23 is connected to a first input port of the mode coupler 27. The entrance end of the single-mode fiber 24 is connectable to the second port of the circulator 22, and an exit end of the single-mode fiber 24 is connected to a second input port of the mode coupler 27. An entrance end of the single-mode fiber 25 is connectable to the probe light output port of the BOTDA 21, and an exit end of the single-mode fiber 25 is connected to a first input port of the mode coupler 28. An entrance end of the single-mode fiber 26 is connectable to the probe light output port of the BOTDA 21, and an exit end of the single-mode fiber 26 is connected to a second input port of the mode coupler 28.

The mode coupler 27 includes two input ports (that is, the first input port and the second input port) and one output port. As has been described, the first input port of the mode coupler 27 is connected to the exit end of the single-mode fiber 23, and the second input port of the mode coupler 27 is connected to the exit end of the single-mode fiber 24. The output port of the mode coupler 27 is connected to an entrance end of the multimode fiber MF. The mode coupler 27 couples a propagation mode in the single-mode fiber 23 with an LP01 mode in the multimode fiber MF, and couples a propagation mode in the single-mode fiber 24 with an LP11 mode in the multimode fiber MF.

The mode coupler 28 includes two input ports (that is, the first input port and the second input port) and one output port. As has been described, the first input port of the mode coupler 28 is connected to the exit end of the single-mode fiber 25, and the second input port of the mode coupler 28 is connected to the exit end of the single-mode fiber 26. The output port of the mode coupler 28 is connected to an entrance end of the multimode fiber MF which entrance end is opposite from the mode coupler 27. The mode coupler 28 couples a propagation mode in the single-mode fiber 25 with the LP01 mode in the multimode fiber MF, and couples a propagation mode in the single-mode fiber 26 with the LP11 mode in the multimode fiber MF.

By connecting the single-mode fiber 23 to the second port of the circulator 22 and connecting the single-mode fiber 25 to the probe light output port of the BOTDA 21 as illustrated in FIG. 4A, it is possible to input, into the multimode fiber MF, pulsed light generated in the BOTDA 21, and possible to input, into the BOTDA 21, probe light in the LP01 mode which probe light has been amplified in the multimode fiber MF. The BOTDA 21 specifies a Brillouin frequency shift $v_{LP01 \rightarrow L01 \rightarrow LP01}$ from a frequency spectrum of an amplification degree of the probe light in the LP01 mode.

By connecting the single-mode fiber 24 to the second port of the circulator 22 and connecting the single-mode fiber 26 to the probe light output port of the BOTDA 21 as illustrated in FIG. 4B, it is possible to input, into the multimode fiber MF, pulsed light generated in the BOTDA 21, and possible to input, into the BOTDA 21, probe light in the LP11 mode which probe light has been amplified in the multimode fiber MF. The BOTDA 21 specifies a Brillouin frequency shift $v_{LP11 \rightarrow L01 \rightarrow LP11}$ from a frequency spectrum of an amplification degree of the probe light in the LP mode.

An effective refractive index difference $\Delta n_{eff}$ between the LP01 mode and the LP mode is obtained by calculating $1/(2kV_{L01})$ of a difference between the Brillouin frequency shift $v_{LP01 \rightarrow L01 \rightarrow LP01}$ and the Brillouin frequency shift $v_{LP11 \rightarrow L01 \rightarrow LP11}$ with use of a computer embedded in or connected to the BOTDA 21.

Note that the BOTDA 21 is capable of obtaining a time series of Brillouin frequency shifts from frequency spectra of scattered light inputted at respective time points. The scattered light inputted into the BOTDA 21 at the respective time points correspond to scattered light having occurred at respective points in the multimode fiber MF. Therefore, it is possible to consider the time series of the Brillouin frequency shifts, which is obtained by the BOTDA 21, as longitudinal distribution of a Brillouin frequency shift in the multimode fiber MF. Furthermore, it is possible to consider a time series of effective refractive index differences $\Delta n_{eff}$, which is obtained from the time series of the Brillouin frequency shifts, as longitudinal distribution of an effective refractive index difference $\Delta n_{eff}$ in the multimode fiber MF.

[Measurement Method]

Figure 5:
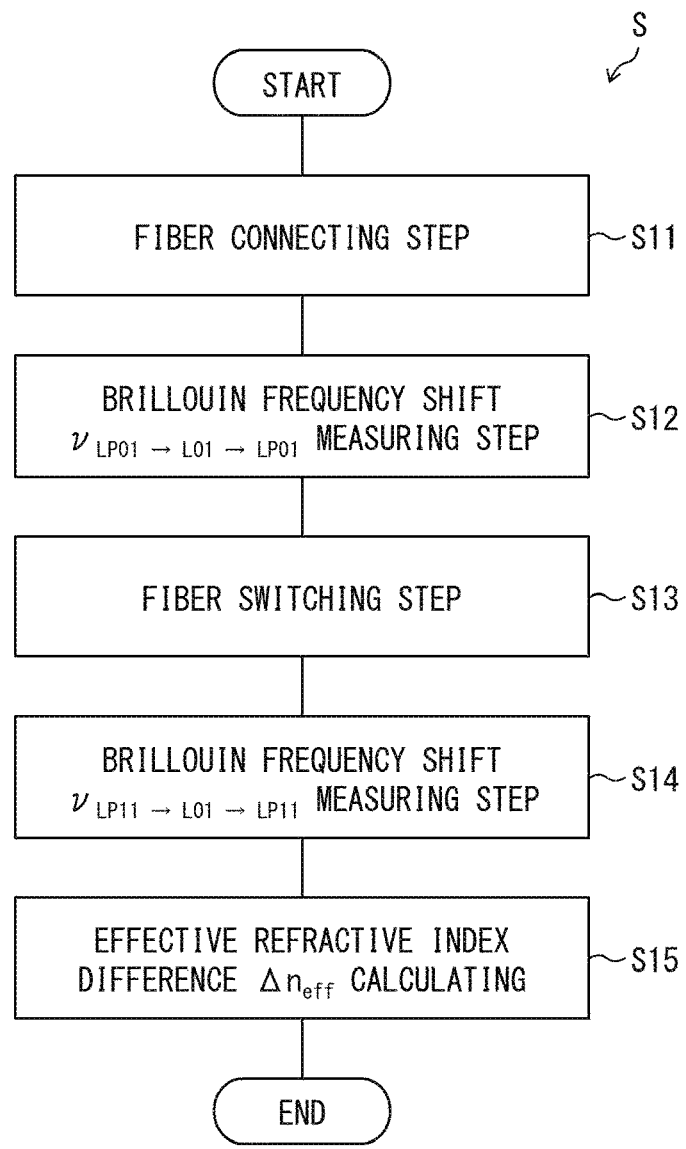
FIG. 5 is a flowchart illustrating a measurement method in accordance with one or more embodiments of the present invention.

A measurement method S in accordance with one or more embodiments of the present invention will be described below with reference to FIG. 5. FIG. 5 is a flowchart of the measurement method S according to one or more embodiments. Note that, although a method of measuring an effective refractive index difference $\Delta n_{eff}$ with use of a measurement device 1 including a BOTDR 11 will be described below, the present invention is not limited to such a method. That is, it is possible to measure the effective refractive index difference $\Delta n_{eff}$ with use of, for example, a measurement device 2 including a BOTDA 21.

The measurement method S is a method for measuring an effective refractive index difference $\Delta n_{eff}$ of a multimode fiber MF with use of a measurement device 1, and includes a fiber connecting step S11, a Brillouin frequency shift $v_{LP01 \to L01 \to LP01}$ measuring step S12, a fiber switching step S13, a Brillouin frequency shift $v_{LP11 \to L01 \to LP11}$ measuring step S14, and an effective refractive index difference $\Delta n_{eff}$ calculating step S15.

The fiber connecting step S11 is a step of connecting a single-mode fiber 13 to a second port of a circulator 12.

The Brillouin frequency shift $v_{LP01 \to L01 \to LP01}$ measuring step S12 is a step of measuring a Brillouin frequency shift $v_{LP01 \to L01 \to LP01}$ with use of a BOTDR 11. Specifically, with use of the BOTDR 11, (1) pulsed light is inputted into a multimode fiber MF, (2) a frequency spectrum of scattered light in an LP01 mode is measured, and (3) a frequency is specified which gives the lowest-frequency peak out of peaks in the frequency spectrum thus measured. As has been described in the section [measurement principle], the frequency thus specified represents the Brillouin frequency shift $v_{LP01 \to L01 \to LP01}$.

In the step S12, it is possible to achieve a process of specifying a frequency/frequencies which gives/give a peak/peaks in the frequency spectrum of the scattered light in the LP01 mode, by software with use of a program which causes a computer (not illustrated), embedded in or connected to the BOTDR 11, to carry out a given procedure and which is stored in a storage device (or non-transitory recording medium) included in the computer. Note that, since a procedure for specifying the frequency/frequencies which gives/give the peak/peaks in the frequency spectrum is publicly known, the procedure will not be described here.

The fiber switching step S13 is a step of switching a single-mode fiber connected to the circulator 12 from the single-mode fiber 13 to a single-mode fiber 14.

The Brillouin frequency shift $v_{LP11 \to L01 \to LP11}$ measuring step S14 is a step of measuring a Brillouin frequency shift $v_{LP11 \to L01 \to LP11}$ with use of the BOTDR 11. Specifically, with use of the BOTDR 11, (1) pulsed light is inputted into the multimode fiber MF, (2) a frequency spectrum of scattered light in an LP11 mode is measured, and (3) a frequency is specified which gives the lowest-frequency peak out of peaks in the frequency spectrum thus measured. As has been described in the section [measurement principle], the frequency thus specified represents the Brillouin frequency shift $v_{LP11 \to L01 \to LP11}$.

In the step S14, it is possible to achieve a process of specifying the frequency which gives the lowest-frequency peak out of two peaks in the frequency spectrum of the scattered light in the LP11 mode, by software with use of a program which causes the computer to carry out a given procedure and which is stored in the storage device. Note that, as a procedure for specifying frequencies which give the respective two peaks, fitting ($v_{LP11 \to L01 \to LP11}$ and $v_{LP11 \to L21 \to LP11}$ are determined so that f(v) defined by Expression (10) best approximates a measured spectrum) can be used. In this case, even in a case where the two peaks in the frequency spectrum of the scattered light in the LP mode are close to each other, it is possible to accurately specify each of the frequencies which give the respective two peaks.

The effective refractive index difference $\Delta n_{eff}$ calculating step S15 is a step of calculating an effective refractive index difference $\Delta n_{eff}$ between the LP01 mode and the LP mode in accordance with Expression (11) with use of the Brillouin frequency shift $v_{LP01 \to L01 \to LP01}$ measured in the step S12 and the Brillouin frequency shift $v_{LP11 \to L01 \to LP11}$ measured in the step S14.

Note that, it is possible to achieve the step S15 by software with use of a program which causes the computer to carry out a given procedure and which is stored in the storage device. Examples of a procedure for calculating the effective refractive index difference $\Delta n_{eff}$ include a procedure in which (1) the Brillouin frequency shift $v_{LP11 \to L01 \to LP11}$ is subtracted from the Brillouin frequency shift $v_{LP01 \to L01 \to LP01}$, (2) a difference thus obtained is divided by 2, (3) a quotient thus obtained is further divided by a constant k, and (4) a quotient thus obtained is further divided by a constant $V_{L01}$.

Note that the step S12 (S14) can be a step of measuring a Brillouin frequency shift $v_{LP01 \to L01 \to LP01}$ ($v_{LP11 \to L01 \to LP11}$) at a specific point in the multimode fiber MF or can be alternatively a step of measuring longitudinal distribution of a Brillouin frequency shift $v_{LP01 \to L01 \to LP01}$ ($v_{LP11 \to L01 \to LP11}$) in the multimode fiber MF. Accordingly, the step S15 can be a step of calculating an effective refractive index difference $\Delta n_{eff}$ at the specific point in the multimode fiber MF from the Brillouin frequency shift $v_{LP01 \to L01 \to LP01}$ ($v_{LP11 \to L01 \to LP11}$) at the specific point in the multimode fiber MF or can be alternatively a step of calculating longitudinal distribution of an effective refractive index difference $\Delta n_{eff}$ in the multimode fiber MF from the longitudinal distribution of the Brillouin frequency shift $v_{LP01 \to L01 \to LP01}$ ($v_{LP11 \to L01 \to LP11}$) in the multimode fiber MF.

EXAMPLE

Examples according to one or more embodiments of the Brillouin frequency shift $v_{LP01 \to L01 \to LP01}$ measuring step S12 and the Brillouin frequency shift $v_{LP11 \to L01 \to LP11}$ measuring step S14 will be described below with reference to FIGS. 6A and 6B, for illustration purposes only.

Figure 6A:
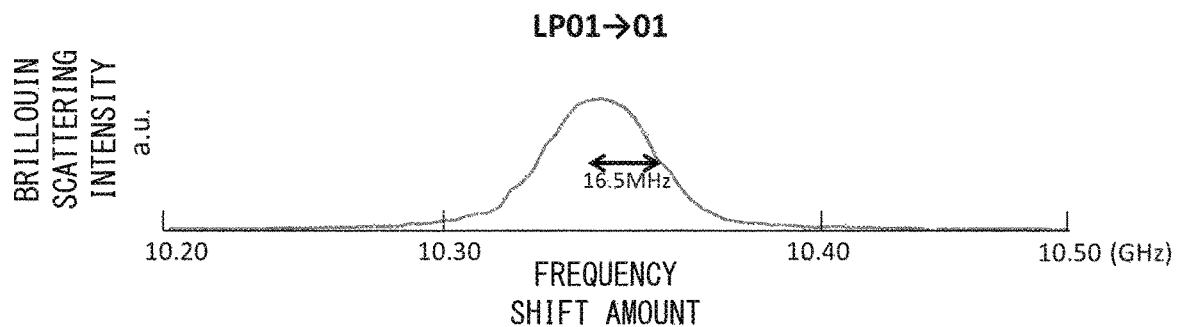
FIG. 6A is a graph illustrating an example of a frequency spectrum measured in a step S12 illustrated in FIG. 5.

FIG. 6A illustrates a frequency spectrum of scattered light in an LP01 mode, which frequency spectrum was actually measured in the step S12. FIG. 6B illustrates a frequency spectrum of scattered light in an LP11 mode, which frequency spectrum was actually measured in the step S14.

Scattered light measured in the step S12 is scattered light which has occurred by a scattering process <LP01→L01→LP01>. Therefore, as A, v, and $\Delta v$ which give the best (minimax) approximation of an actually measured frequency spectrum to a single Lorentzian function f(v) defined by Expression (12), it is possible to specify scattering intensity, a Brillouin frequency shift $v_{LP01 \to L01 \to LP01}$, and a full width at half maximum in the frequency spectrum, respectively.

[Math. 12]

$$f(v) = A \frac{1}{(v - v_1)^2 + (\Delta v/2)^2} \quad (12)$$

A, v1, and $\Delta v$ which gave the best approximation of the frequency spectrum illustrated in FIG. 6A were actually calculated, and a result that v=10.344 GHz and $\Delta v/2$=16.0 MHz was obtained. That is, the Brillouin frequency shift $v_{LP01 \to L01 \to LP01}$ was specified as 10.344 GHz.

On the other hand, scattered light measured in the step S14 is scattered light which has occurred by a scattering process <LP11→L01→LP11> or <LP11→L21→LP11> or which has occurred via a higher acoustic mode. Therefore, it is possible to specify scattering intensities, which correspond to respective scattering processes, and Brillouin frequency shifts, which correspond to the respective scattering processes, as A1, v1, A2, v2, A3, and v3 which give the best approximation of an actually measured frequency spectrum to a sum f(v) of three Lorentzian functions, which sum is defined by Expression (13). Out of specified v1, v2, and v3 (assumed that v1<v2<v3), v1, which is the smallest, is a Brillouin frequency shift $v_{LP11 \to L01 \to LP11}$. Note that, in the step S12, Δv/2 is handled as an unknown parameter whose value should be specified, but, in the step S14, Δv/2 is handled as a known parameter which has a value specified in the step S12.

Figure 6B:
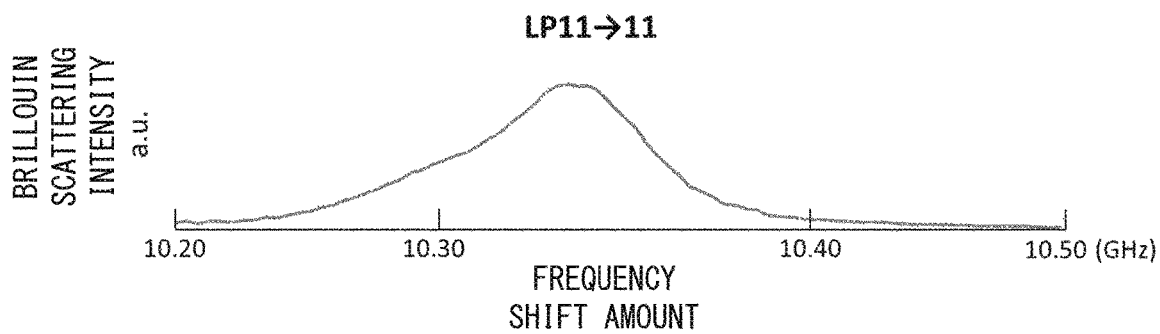
FIG. 6B is a graph illustrating an example of a frequency spectrum measured in a step S14 illustrated in FIG. 5.
Figure 6C:
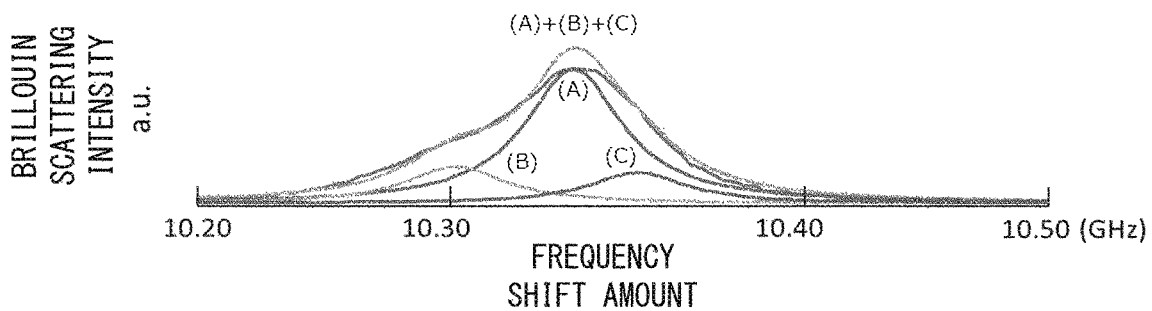
FIG. 6C is a graph obtained by individually plotting three Lorentzian functions, a sum of which best approximates the frequency spectrum measured in the step S14 illustrated in FIG. 5.

A1, v1, A2, v2, A3, and v3 which gave the best approximation of the frequency spectrum illustrated in FIG. 6B were actually calculated while it was assumed that Δv/2=16 MHz, and a result that v1=10.302 GHz was obtained. That is, the Brillouin frequency shift $v_{LP11 \to L01 \to LP11}$ was specified as 10.302 GHz. Note that, in a case where the first term, the second term, and the third term of Expression (13) are individually plotted with use of calculated A1, v1, A2, v2, A3, and v3, graphs (B), (A), and (C) illustrated in FIG. 6C are obtained.

[Math. 13]

$$f(v) = A_1 \frac{1}{(v-v_1)^2 + (\Delta v/2)^2} + A_2 \frac{1}{(v-v_2)^2 + (\Delta v/2)^2} + A_3 \frac{1}{(v-v_3)^2 + (\Delta v/2)^2} \quad (13)$$

In a case where (i) the Brillouin frequency shift $v_{LP01 \to L01 \to LP01}$ specified in the step S12 is 10.344 GHz and (ii) the Brillouin frequency shift $v_{LP11 \to L01 \to LP11}$ specified in the step S14 is 10.302 GHz, an effective refractive index difference $\Delta n_{eff}$ calculated in the step S15 is $5.9 \times 10^{-3}$. This result shows that the effective refractive index difference well corresponds to a design value.

[Supplementary Note]

The present invention is not limited to the above-described embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the embodiments.

For example, in this specification, one or more embodiments have been described in which (i) a multimode fiber, having merely an LP01 mode and an LP mode as propagation modes, is taken as an example and (ii) an effective refractive index difference between the LP01 mode and the LP11 mode is measured. However, the present invention is not limited to such embodiments. That is, according to one or more embodiments of the present invention, it is possible to measure an effective refractive index difference between two propagation modes (one of which is referred to as a first propagation mode and the other of which is referred to as a second propagation mode) which are arbitrarily selected from propagation modes that a multimode fiber has.

That is, it is possible to calculate the effective refractive index difference $\Delta n_{eff}$ between the two propagation modes by carrying out the following steps: (1) a step of measuring a first Brillouin frequency shift v1 by specifying a frequency which gives the lowest-frequency peak out of peaks in a frequency spectrum of scattered light in the first propagation mode which scattered light occurs in a case where light in the first propagation mode is inputted into the multimode fiber; (2) a step of measuring a second Brillouin frequency shift v2 by specifying a frequency which gives the lowest-frequency peak out of peaks in a frequency spectrum of scattered light in the second propagation mode which scattered light occurs in a case where light in the second propagation mode is inputted into the multimode fiber; and (3) a step of calculating the effective refractive index difference $\Delta n_{eff}$ in accordance with $\Delta n_{eff} = (v1-v2)/(2kV_{L01})$ with use of such a measured first Brillouin frequency shift v1 and such a measured second Brillouin frequency shift v2.

For example, in a case where an effective refractive index difference $\Delta n_{eff}$ between an LP01 mode and an LP21 mode is measured, it is only necessary to carry out the following steps: (1) a step of measuring a Brillouin frequency shift $v_{LP01 \to L01 \to LP01}$ by specifying a frequency which gives the lowest-frequency peak out of peaks in a frequency spectrum of scattered light in the LP01 mode which scattered light occurs in a case where light in the LP01 mode is inputted into the multimode fiber; (2) a step of measuring a Brillouin frequency shift $v_{LP21 \to L01 \to LP21}$ by specifying a frequency which gives the lowest-frequency peak out of peaks in a frequency spectrum of scattered light in the LP21 mode which scattered light occurs in a case where light in the LP21 mode is inputted into the multimode fiber; and (3) a step of calculating the effective refractive index difference $\Delta n_{eff}$ in accordance with $\Delta n_{eff} = (v_{LP01 \to L01 \to LP01} - v_{LP21 \to L01 \to LP21})/(2kV_{L01})$ with use of such a measured Brillouin frequency shift $v_{LP01 \to L01 \to LP01}$ and such a measured Brillouin frequency shift $v_{LP21 \to L01 \to LP21}$.

Some mode couplers couple degenerate propagation modes (for example, LP11 a mode and LP11 b mode) in a multimode fiber with a propagation mode in a single single-mode fiber without any distinction, and others couple the degenerate propagation modes in the multimode fiber to respective propagation modes in a plurality of single-mode fibers in distinction. In a case where a mode coupler of a latter type is used, any of the plurality of single-mode fibers can be used.

[Recap]

A measurement method in accordance with one or more embodiments is a measurement method for measuring an effective refractive index difference between two propagation modes which a multimode fiber has, the method including the steps of: (a) measuring a first Brillouin frequency shift v1 by specifying a frequency which gives the lowest-frequency peak out of peaks included in a frequency spectrum of scattered light in a first propagation mode which scattered light occurs in a case where light in the first propagation mode is inputted into the multimode fiber; (b) measuring a second Brillouin frequency shift v2 by specifying a frequency which gives the lowest-frequency peak out of peaks included in a frequency spectrum of scattered light in a second propagation mode which scattered light occurs in a case where light in the second propagation mode is inputted into the multimode fiber; and (c) calculating an effective refractive index difference $\Delta n_{eff}$ in accordance with $\Delta n_{eff} = (v1-v2)/(2kV_L)$ with use of (i) the first Brillouin frequency shift v1 measured in the step (a), (ii) the second Brillouin frequency shift v2 measured in the step (b), (iii) a predetermined wave number k of light in a vacuum, and (iv) a predetermined constant $V_L$.

According to the above configuration, it is possible to measure the effective refractive index difference $\Delta n_{\it eff}$ between the first propagation mode and the second propagation mode at a specific point in the multimode fiber.

The measurement method in accordance with one or more embodiments may be arranged such that: the step (a) is a step of measuring longitudinal distribution of the first Brillouin frequency shift v1 in the multimode fiber with use of a BOTDR (Brillouin Optical-Fiber Time Domain Reflectometry) or a BOTDA (Brillouin Optical-Fiber Time Domain Analysis); the step (b) is a step of measuring longitudinal distribution of the second Brillouin frequency shift v2 in the multimode fiber with use of the BOTDR; and the step (c) is a step of calculating longitudinal distribution of the effective refractive index difference $\Delta n_{\it eff}$ in the multimode fiber with use of the longitudinal distribution of the first Brillouin frequency shift v1 measured in the step (a) and the longitudinal distribution of the second Brillouin frequency shift v2 measured in the step (b).

According to the above configuration, it is possible to measure the longitudinal distribution of the effective refractive index difference $\Delta n_{\it eff}$ between the first propagation mode and the second propagation mode in the multimode fiber.

The measurement method in accordance with one or more embodiments may be arranged such that: in the step (a), a frequency is specified which gives a peak of a single Lorentzian function that best approximates the frequency spectrum or which gives the lowest-frequency peak out of respective peaks of a plurality of Lorentzian functions a sum of which best approximates the frequency spectrum; and in the step (b), a frequency is specified which gives a peak of a single Lorentzian function that best approximates the frequency spectrum or which gives the lowest-frequency peak out of respective peaks of a plurality of Lorentzian functions a sum of which best approximates the frequency spectrum.

According to the above configuration, it is possible to accurately specify the first Brillouin frequency shift v1 even in a case where the frequency spectrum which is referred to in the step (a) includes peaks, corresponding to respective scattering processes, in such a manner that the peaks overlap each other and are not apparently identifiable. Similarly, it is possible to accurately specify the second Brillouin frequency shift v2 even in a case where the frequency spectrum which is referred to in the step (b) includes peaks, corresponding to respective scattering processes, in such a manner that the peaks overlap each other and are not apparently identifiable.

The measurement method in accordance with one or more embodiments may be arranged such that: the first propagation mode is an LP01 mode; the second propagation mode is an LP mode; the first Brillouin frequency shift v1 is a Brillouin frequency shift $v_{LP01 \to L01 \to LP01}$ corresponding to a scattering process in which scattered light in the LP01 mode occurs from light in the LP01 mode via an acoustic mode L01; the second Brillouin frequency shift v2 is a Brillouin frequency shift $v_{LP11 \to L01 \to LP11}$ corresponding to a scattering process in which scattered light in the LP mode occurs from light in the LP11 mode via the acoustic mode L01; and the constant $V_L$ is an approximate value of a longitudinal phase velocity $V_{L01}$ of the acoustic mode L01.

According to the above configuration, it is possible to measure the effective refractive index difference $\Delta n_{\it eff}$ between the LP01 mode and the LP mode at a specific point in the multimode fiber.

A measurement device in accordance with one or more embodiments is a measurement device for measuring an effective refractive index difference between two propagation modes which a multimode fiber has, the device including: a BOTDR having an output port and an input port; a circulator having a first port, a second port, and a third port, the first port of the circulator being connected to the output port of the BOTDR, the third port of the circulator being connected to the input port of the BOTDR; first and second single-mode fibers each having an input end and an output end, any one of the input end of the first single-mode fiber and the input end of the second single-mode fiber being switchably connected to the second port of the circulator; and a mode coupler having a first input port, a second input port, and an output port, the first input port of the mode coupler being connected to the output end of the first single-mode fiber, the second input port of the mode coupler being connected to the output end of the second single-mode fiber, the output port of the mode coupler being connected to an input end of the multimode fiber, the mode coupler being configured to couple a propagation mode in the first single-mode fiber with a first propagation mode in the multimode fiber and couple a propagation mode in the second single-mode fiber with a second propagation mode in the multimode fiber.

A measurement device in accordance with one or more embodiments is a measurement device for measuring an effective refractive index difference between two propagation modes which a multimode fiber has, the device including: a BOTDA having a pump light output port and a probe light input port; a circulator having a first port, a second port, and a third port, the first port of the circulator being connected to the pump light output port of the BOTDA, the third port of the circulator being connected to the probe light input port of the BOTDA; first and second single-mode fibers each having an input end and an output end, any one of the input end of the first single-mode fiber and the input end of the second single-mode fiber being switchably connected to the second port of the circulator; a first mode coupler having a first input port, a second input port, and an output port, the first input port of the first mode coupler being connected to the output end of the first single-mode fiber, the second input port of the first mode coupler being connected to the output end of the second single-mode fiber, the output port of the first mode coupler being connected to an input end of the multimode fiber, the first mode coupler being configured to couple a propagation mode in the first single-mode fiber with a first propagation mode in the multimode fiber and couple a propagation mode in the second single-mode fiber with a second propagation mode in the multimode fiber; third and fourth single-mode fibers each having an input end and an output end, any one of the output end of the third single-mode fiber and the output end of the fourth single-mode fiber being switchably connected to the probe light input port of the BOTDA; and a second mode coupler having an input port, a first output port, and a second output port, the input port of the second mode coupler being connected to an output end of the multimode fiber, the first output port of the second mode coupler being connected to the input end of the third single-mode fiber, the second output port of the second mode coupler being connected to the input end of the fourth single-mode fiber, the second mode coupler being configured to couple the first propagation mode in the multimode fiber with a propagation mode in the third single-mode fiber and couple the second propagation mode in the multimode fiber with a propagation mode in the second single-mode fiber.

By using the measurement device, it is possible to easily carry out the above-described measurement method.

A measurement program in accordance with one or more embodiments is a measurement program for measuring an effective refractive index difference between two propagation modes which a multimode fiber has, the program causing a computer to carry out procedures for: (a) measuring a first Brillouin frequency shift ν1 by specifying a frequency which gives the lowest-frequency peak out of peaks included in a frequency spectrum of scattered light in a first propagation mode which scattered light occurs in a case where light in the first propagation mode is inputted into the multimode fiber; (b) measuring a second Brillouin frequency shift ν2 by specifying a frequency which gives the lowest-frequency peak out of peaks included in a frequency spectrum of scattered light in a second propagation mode which scattered light occurs in a case where light in the second propagation mode is inputted into the multimode fiber; and (c) calculating an effective refractive index difference $\Delta n_{\textit{eff}}$ in accordance with $\Delta n_{\textit{eff}} = (\nu 1 - \nu 2)/(2kV_L)$ with use of (i) the first Brillouin frequency shift ν1 measured in the step (a), (ii) the second Brillouin frequency shift ν2 measured in the step (b), (iii) a predetermined wave number k of light in a vacuum, and (iv) a predetermined constant $V_L$.

By using the measurement program, it is possible to easily carry out the above-described measurement method.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Measurement device
11 BOTDR
12 Circulator
13 Single-mode fiber (first single-mode fiber)
14 Single-mode fiber (second single-mode fiber)
15 Mode coupler
2 Measurement device
21 BOTDR
22 Circulator
23 Single-mode fiber (first single-mode fiber)
24 Single-mode fiber (second single-mode fiber)
25 Single-mode fiber (third single-mode fiber)
26 Single-mode fiber (fourth single-mode fiber)
27 Mode coupler (first mode coupler)
28 Mode coupler (second mode coupler)
MF Multimode fiber
S Measurement method
S11 Fiber connecting step
S12 Brillouin frequency shift $\nu_{LP01 \to L01 \to LP01}$ measuring step
S13 Fiber switching step
S14 Brillouin frequency shift $\nu_{LP11 \to L01 \to LP11}$ measuring step
S15 Effective refractive index difference $\Delta n_{\textit{eff}}$ calculating step

The invention claimed is:

1. A measurement method for measuring an effective refractive index difference between two propagation modes of a multimode fiber, the method comprising:
    measuring a first Brillouin frequency shift ν1 by specifying a frequency having a lowest-frequency peak out of peaks in a first frequency spectrum of scattered light in a first propagation mode, wherein the scattered light in a first propagation mode occurs when light in the first propagation mode is inputted into the multimode fiber;
    measuring a second Brillouin frequency shift ν2 by specifying a frequency having a lowest-frequency peak out of peaks in a second frequency spectrum of scattered light in a second propagation mode, wherein the scattered light in a second propagation mode occurs when light in the second propagation mode is inputted into the multimode fiber; and
    calculating an effective refractive index difference $\Delta n_{\textit{eff}}$ in accordance with $\Delta n_{\textit{eff}} = (\nu 1 - \nu 2)/(2kV_L)$ with use of the first Brillouin frequency shift ν1, the second Brillouin frequency shift ν2, a predetermined wave number k of light in a vacuum, and a predetermined constant $V_L$.

2. The measurement method as set forth in claim 1, wherein:
    the measuring of the first Brillouin frequency shift ν1 comprises measuring longitudinal distribution of the first Brillouin frequency shift ν1 in the multimode fiber with a BOTDR (Brillouin Optical-Fiber Time Domain Reflectometry) or a BOTDA (Brillouin Optical-Fiber Time Domain Analysis);
    the measuring of the second Brillouin frequency shift ν2 comprises measuring longitudinal distribution of the second Brillouin frequency shift ν2 in the multimode fiber with the BOTDR; and
    the calculating of the effective refractive index difference $\Delta n_{\textit{eff}}$ comprises calculating longitudinal distribution of the effective refractive index difference $\Delta n_{\textit{eff}}$ in the multimode fiber with the longitudinal distribution of the first Brillouin frequency shift ν1 and the longitudinal distribution of the second Brillouin frequency shift ν2.

3. The measurement method as set forth in claim 1, wherein:
    the measuring of the first Brillouin frequency shift ν1 comprises specifying a frequency that has a peak of a single Lorentzian function that best approximates the first frequency spectrum or of a Lorentzian function whose peak is in a lowest frequency side among a plurality of Lorentzian functions that form a sum that best approximates the first frequency spectrum; and
    the measuring of the second Brillouin frequency shift ν2 comprises specifying a frequency that has a peak of a single Lorentzian function that best approximates the second frequency spectrum or of a Lorentzian function whose peak is in a lowest frequency side among a plurality of Lorentzian functions that form a sum that best approximates the second frequency spectrum.

4. The measurement method as set forth in claim 1, wherein:
    the first propagation mode is an LP01 mode;
    the second propagation mode is an LP11 mode;
    the first Brillouin frequency shift ν1 is a Brillouin frequency shift $\nu_{LP01 \to L01 \to LP01}$ corresponding to a scattering process in which scattered light in the LP01 mode occurs from light in the LP01 mode via an acoustic mode L01;
    the second Brillouin frequency shift ν2 is a Brillouin frequency shift $\nu_{LP11 \to L01 \to LP11}$ corresponding to a scattering process in which scattered light in the LP11 mode occurs from light in the LP11 mode via the acoustic mode L01; and
    the constant $V_L$ is an approximate value of a longitudinal phase velocity $V_{L01}$ of the acoustic mode L01.

5. A measurement device for measuring an effective refractive index difference between two propagation modes of a multimode fiber, the device comprising:
- a BOTDR (Brillouin Optical-Fiber Time Domain Reflectometry) that comprises an output port and an input port;
- a circulator that comprises a first port, a second port, and a third port, wherein the first port connects the output port of the BOTDR, and the third port connects to the input port of the BOTDR;
- first and second single-mode fibers that each comprise an input end and an output end, wherein one of the input end of the first single-mode fiber and the input end of the second single-mode fiber connects to the second port of the circulator; and
- a mode coupler that comprises a first input port, a second input port, and an output port, wherein the first input port of the mode coupler connects to the output end of the first single-mode fiber, the second input port of the mode coupler connects to the output end of the second single-mode fiber, the output port of the mode coupler connects to an input end of the multimode fiber, and the mode coupler couples a propagation mode in the first single-mode fiber with a first propagation mode in the multimode fiber and couples a propagation mode in the second single-mode fiber with a second propagation mode in the multimode fiber.

6. A measurement device for measuring an effective refractive index difference between two propagation modes which a multimode fiber has, the device comprising:
- a BOTDA (Brillouin Optical-Fiber Time Domain Analysis) that comprises a pump light output port and a probe light input port;
- a circulator that comprises a first port, a second port, and a third port, wherein the first port of the circulator connects to the pump light output port of the BOTDA, and the third port connects to the probe light input port of the BOTDA;
- first and second single-mode fibers that each comprise an input end and an output end, wherein one of the input end of the first single-mode fiber and the input end of the second single-mode fiber connects to the second port of the circulator;
- a first mode coupler that comprises a first input port, a second input port, and an output port, wherein the first input port of the first mode coupler connects to the output end of the first single-mode fiber, the second input port of the first mode coupler connects to the output end of the second single-mode fiber, the output port of the first mode coupler connects to an input end of the multimode fiber, and the first mode coupler couples a propagation mode in the first single-mode fiber with a first propagation mode in the multimode fiber and couples a propagation mode in the second single-mode fiber with a second propagation mode in the multimode fiber;
- third and fourth single-mode fibers that each comprise an input end and an output end, wherein one of the output end of the third single-mode fiber and the output end of the fourth single-mode fiber connects to the probe light input port of the BOTDA; and
- a second mode coupler that comprises an input port, a first output port, and a second output port, wherein the input port of the second mode coupler connects to an output end of the multimode fiber, the first output port of the second mode coupler connects to the input end of the third single-mode fiber, the second output port of the second mode coupler connects to the input end of the fourth single-mode fiber, and the second mode coupler couples the first propagation mode in the multimode fiber with a propagation mode in the third single-mode fiber and couples the second propagation mode in the multimode fiber with a propagation mode in the second single-mode fiber.

7. A non-transitory recording medium storing a computer-readable program for measuring an effective refractive index difference between two propagation modes of a multimode fiber, wherein the computer-readable program causes a computer to:
- measure a first Brillouin frequency shift $v1$ by specifying a frequency having a lowest-frequency peak out of peaks in a first frequency spectrum of scattered light in a first propagation mode, wherein the scattered light in a first propagation mode occurs when light in the first propagation mode is inputted into the multimode fiber;
- measure a second Brillouin frequency shift $v2$ by specifying a frequency having a lowest-frequency peak out of peaks in a second frequency spectrum of scattered light in a second propagation mode, wherein the scattered light in a second propagation mode occurs when light in the second propagation mode is inputted into the multimode fiber; and
- calculate an effective refractive index difference $\Delta n_{\textit{eff}}$ in accordance with $\Delta n_{\textit{eff}} = (v1-v2)/(2kV_L)$ with use of the first Brillouin frequency shift $v1$, the second Brillouin frequency shift $v2$, a predetermined wave number k of light in a vacuum, and a predetermined constant $V_L$.

* * * * *